(12) United States Patent
Longobardi et al.

(10) Patent No.: US 9,541,057 B2
(45) Date of Patent: Jan. 10, 2017

(54) REGULATION VALVE CONTROL BASED ON FLUID LEVEL CHANGES

(71) Applicant: International Business Machines Corporation, Armonk, NY (US)

(72) Inventors: Giuseppe Longobardi, Castellammare di Stabia (IT); Scot MacLellan, Rome (IT)

(73) Assignee: International Business Machines Corporation, Armonk, NY (US)

( * ) Notice: Subject to any disclaimer, the term of this patent is extended or adjusted under 35 U.S.C. 154(b) by 811 days.

(21) Appl. No.: 13/745,885

(22) Filed: Jan. 21, 2013

(65) Prior Publication Data
US 2014/0207293 A1 Jul. 24, 2014

(51) Int. Cl.
*F03B 15/14* (2006.01)

(52) U.S. Cl.
CPC ............ *F03B 15/14* (2013.01); *F05B 2220/60* (2013.01); *Y02B 10/50* (2013.01); *Y02E 10/226* (2013.01)

(58) Field of Classification Search
None
See application file for complete search history.

(56) References Cited

U.S. PATENT DOCUMENTS

| | | | |
|---|---|---|---|
| 4,772,157 A * | 9/1988 | Obermeyer | ............ 405/75 |
| 7,632,040 B2 | 12/2009 | Cripps | |
| 7,944,072 B2 | 5/2011 | McKie | |
| 2009/0058092 A1 | 3/2009 | Chen | |
| 2010/0205870 A1 | 8/2010 | Cobb | |
| 2011/0175362 A1 * | 7/2011 | Gracia Lopez | ............ 290/55 |

OTHER PUBLICATIONS

"Each Italian consumes 200 liters of water per day"; Cronache; Sep. 11, 2008; Copyright 2010 RCS Quotidiani Spa. Tutti i diritti sono riservati; <http://www.corriere.it/cronache/08_settembre_11/acqua_risparmio_spreco_35a3124c-8023-11dd-9f6f-00144f02aabc.shtml>; (pp. 1 & 2 in Italian, pp. 3 & 4 Google English Translation).
"Greywater for domestic users: an information guide"; Environment Agency; May 2011; pp. 1-30; Environment Agency: Bristol; Copyright by Environment Agency.
Quick, Darren; "HighDro Power converts falling wastewater into electricity", Ecogizmo; Jul. 22, 2010; printed Oct. 3, 2012; <http://www.gizmag.com/highdro-power/15805/>.

(Continued)

*Primary Examiner* — Mohammad Ali
*Assistant Examiner* — Saad M Kabir
(74) *Attorney, Agent, or Firm* — David B. Woycechowsky (57) ABSTRACT

Exemplary embodiments of the present invention disclose a method, computer program product, and system for energy production from fluid. In a step, the computer determines if the rate of the fluid level increase in the one of the one or more fluid reservoirs is above a predetermined threshold. In a step, the computer sends a signal to a bypass valve to open and release fluid through a bypass fluid connection from the one of the one or more fluid reservoirs if the rate of the fluid level increase in the one of the one or more fluid reservoirs is above a predetermined threshold. In a step, the computer sends a signal to a regulation valve to open for fluid connection to one or more turbines if the fluid level of the one of the one or more fluid reservoirs is above the predetermined threshold level.

18 Claims, 3 Drawing Sheets

(56) References Cited

OTHER PUBLICATIONS

"Huber Solutions for Wastewater Reuse"; Huber Technology Waste Water Solutions; Copyright 2011 Huber SE; <http://www.huber.de/solutions/wastewater-reuse.html>.

"waste water electricity"; Mahindra Rise; Printed Jan. 9, 2012; Copyright 2011 Mahindra Rise; <http://www.sparktherise.com/projectdetail.php?pid=2665>.

* cited by examiner

REGULATION VALVE CONTROL BASED ON FLUID LEVEL CHANGES

FIELD OF THE INVENTION

The present invention relates generally to the field of energy production and more particularly to energy production from fluid.

BACKGROUND OF THE INVENTION

Producing energy from recycling and from renewable resources has become a need to reduce pollution and to reduce the consumption of fossil fuels and other non-renewable resources. It is well known that water and other fluids contain at least two kinds of energy. The first kind of energy is kinetic energy which is related at least to fluid flow properties. Fluid can also contain potential energy which is stored in the fluid due to the physical height of the fluid relative to a lower physical height. The potential energy of the fluid may turn to kinetic energy when the fluid flows from a greater height to a lower height due to gravity. When fluid flows or falls, power can be generated by using several devices, such as turbines and generators.

SUMMARY

Exemplary embodiments of the present invention disclose a method, computer program product, and system for energy production from fluid. In a step, a computer determines a fluid level in one or more fluid reservoirs utilizing data received from one or more sensors. In a step, the computer determines a rate of the fluid level increase within one of the one or more fluid reservoirs utilizing the data received from the sensors. In a step, the computer determines if the rate of the fluid level increase in the one of the one or more fluid reservoirs is above a predetermined threshold. In a step, the computer sends a signal to a bypass valve to open and release fluid through a bypass fluid connection from the one of the one or more fluid reservoirs if the rate of the fluid level increase in the one of the one or more fluid reservoirs is above a predetermined threshold. In a step, the computer determines if a fluid level threshold is reached in the one of the one or more fluid reservoirs. In a step, the computer sends a signal to a regulation valve to open for fluid connection to one or more turbines if the fluid level of the one of the one or more fluid reservoirs is above the predetermined threshold level.

DETAILED DESCRIPTION

Exemplary embodiments of an energy production system may use existing fluid, such as wastewater, produced in a building structure to produce energy. The potential energy found in fluid is converted into kinetic energy when the fluid is dropped in vertical height due to gravitational forces. The kinetic energy of the flowing fluid is used to store electricity that in turned is used to supplement energy use or is used to power devices within the building structure.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
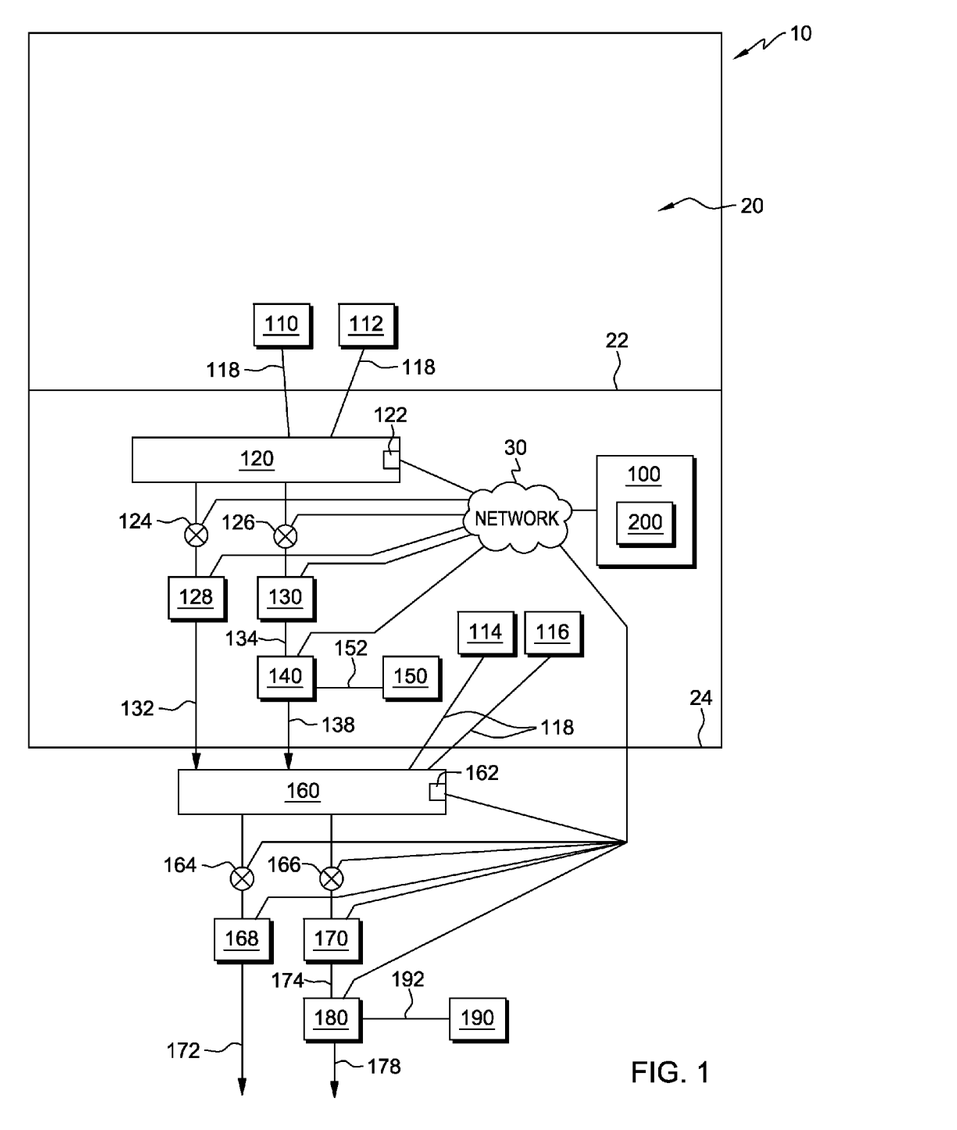
FIG. 1 is a block diagram illustrating an energy production system, in accordance with an embodiment of the present invention.

The present invention will now be described in detail with reference to the Figures. FIG. 1 is a block diagram illustrating an energy production system, generally designated 10, in accordance with one embodiment of the present invention. Exemplary embodiments of energy production system 10 includes fluid sources 110, fluid reservoirs 120, turbines 140, energy storage devices 150, and computer 100 housed within building structure 20. Although building structure 20 houses all components within energy production system 10 depicted in FIG. 1, in other examples, building structure may not house all components. Additionally, although FIG. 1 depicts energy production system 10 operating within a two-level building structure, other exemplary embodiments of energy production system 10 may be situated within building structures of any number of levels.

Exemplary embodiments of energy production system 10 include fluid sources 110, 112, 114 and 116 that collect fluid within building structure 20. The fluid may include any form of fluid that can be utilized within the energy production system 10 to produce stored energy. Fluid sources 110, 112, 114 and 116 may be physically located on different levels 22 and 24 of building structure 20. Examples of fluid sources 110 may include, but are not limited to: sinks, showers, tubs, etc.

Exemplary embodiments of energy production system 10 include fluid reservoirs 120 and 160 that gather and store fluid within building structure 20. Fluid reservoirs 120 and 160 are respectively fluidly connected 118 with fluid sources 110, 112, 114 and 116 to gather and store the fluid collected by fluid sources 110, 112, 114 and 116. Fluid reservoirs 120 and 160 may also be fluidly connected 132 therebetween by a bypass connection that facilitates the release of fluid from a fluid reservoir to prevent overflow within the fluid reservoir. The fluid connection may be by a pipe or other form of structure that facilitates fluid connection.

In an example, fluid reservoir 120 is located directly below second level 22 of building structure 20. Fluid reservoir 120 is fluidly connected 132 to fluid reservoir 160 located directly below first level 24. Fluid connection 132 includes a bypass valve 124 that regulates the flow of the fluid that flows from fluid reservoir 120 to fluid reservoir 160. Fluid connection 132 may also include sensor 128. Sensor 128 measures the rate and amount of the fluid flowing through fluid connection 132. In another example, fluid reservoir 160 is fluidly connected 172 to a sewer (not shown). Fluid connection 172 includes a bypass valve 164 that regulates the flow of the fluid that flows from fluid reservoir 160 to the sewer. Fluid connection 172 may also include sensor 168. Sensor 168 measures the rate and amount of the fluid flowing through fluid connection 172.

Fluid reservoirs 120 and 160 are fluidly connected to turbines 140 and 180 respectively by a connection that facilitates the release of fluid from fluid reservoirs 120 and 160 to turbines 140 and 180 for energy production. The fluid connection may be by a pipe or other form of structure that facilitates fluid connection.

In an example, fluid reservoir 120 is located directly below second level 22 of building structure 20. Fluid reservoir 120 is fluidly connected 134 to turbine 140 located directly below second level 22. Fluid connection 134 includes a regulation valve 126 that regulates the flow of the fluid that flows from fluid reservoir 120 to turbine 140. Fluid connection 134 may also include sensor 130. Sensor 130 measures the rate and amount of the fluid flowing through fluid connection 134 to turbine 140. In another example, fluid reservoir 160 is fluidly connected 174 to turbine 180. Fluid connection 174 includes regulation valve 166 that regulates the flow of the fluid that flows from fluid reservoir 160 to turbine 180. Fluid connection 174 may also include sensor 170. Sensor 170 measures the rate and amount of the fluid flowing through fluid connection 174 to turbine 180.

Exemplary embodiments of fluid reservoirs 120 and 160 may be any number of sizes and geometries to collect and house the fluid. In some exemplary embodiments, the size of the fluid reservoirs may increase with a decrease in the level of the building structure where the fluid reservoir is physically situated. In this example, fluid reservoir 160 is larger than fluid reservoir 120, as fluid reservoir 160 not only collects the fluid from fluid sources 114 and 116, but also collects and stores all of the fluid that fluid reservoir 120 has already collected and stored at some point in time.

Exemplary embodiments of fluid reservoirs 120 and 160 include sensors 122 and 162. Sensors 122 and 162 may include any number of sensing capabilities that relay information, typically through electronic signals, to computer 100. In an example, sensors 122 and 162 may sense water level within respective fluid reservoirs 120 and 160. In another example, sensors 122 and 162 sense fluid flow into and out of fluid reservoirs 120 and 160. In yet another example, sensors 122 and 162 may sense temperature, pressure, or any other characteristic related to fluid within fluid reservoirs 120 and 160 that facilitates fluid flow and desired operation of energy production system 10.

Exemplary embodiments of energy production system 10 include turbines 140 and 180 that facilitate the production of energy by converting kinetic energy from the flowing fluid into stored electrical energy. Although the depicted system 10 includes two turbines, in other exemplary embodiments, any number of turbines may be used. Furthermore, depending on design characteristics of the system, turbines may be placed in parallel between fluid reservoirs, or turbines may be placed in series. In one exemplary embodiment, turbines 140 and 180 are a cochlea or Archimedes' screw turbines. In other exemplary embodiments, other types of turbines or devices that can produce power from flowing fluid may be used. Turbines 140 and 180 are sized to produce the largest amount of energy possible with the amount of available water head and available flow rate from the fluid collected within fluid reservoirs 120 and 160.

Turbines 140 and 180 are respectively fluidly connected 138 and 178 with fluid reservoir 160 and the sewer. The fluid connection may be by a pipe or other form of structure that facilitates fluid connection. In an example, turbine 140 is located directly below second level 22 of building structure 20. Turbine 140 is fluidly connected 138 to fluid reservoir 160 located directly below first level 24. Fluid connection 138 may include a sensor (not shown). The sensor measures the rate and amount of the fluid flowing through fluid connection 138. In another example, turbine 180 is fluidly connected 178 to a sewer (not shown). Fluid connection 178 may include a sensor (not shown). The sensor measures the rate and amount of the fluid flowing through fluid connection 178.

Turbines 140 and 180 are respectively electrically connected 152 and 192 with energy storage devices 150 and 190. Energy storage devices 150 and 190 may be any form of device capable of storage energy produced by turbines 140 and 180. In an example, energy storage devices 150 are a battery. Although this exemplary embodiment has single energy storage devices respectively connected to single turbines, in other exemplary embodiments, more than one turbine may be connected to a single energy storage device. In the alternative, more than one energy storage device may be connected with a singe turbine. In some exemplary embodiments, the energy stored in energy storage devices 150 and 190 may replace or supplement recharging of emergency lamps, or contribute to the energy consumption of courtesy night lights, or for all the services which need to operate with a rechargeable battery.

Energy production system 10 includes computer 100 interconnected over network 30 to all valves and sensors. Computer 100 may be a laptop computer, tablet computer, netbook computer, personal computer (PC), a desktop computer, a personal digital assistant (PDA), a smart phone, or any programmable electronic device capable of communicating with all valves and sensors via network 30. Computer 100 gathers information from the sensors within energy production system 10 to later use for determining when to send signals through network 30 to valves to control when valves open and close. Computer 100 may include internal and external hardware components, as depicted and described in further detail with respect to FIG. 3.

Computer 100 includes energy production program 200. Energy production program 200 receives information gathered from sensors within energy production system 10 and determines when to send signals through network 30 to valves within energy production system 10 to regulate the valves to open or close. In the depicted example, energy production program 200 regulates the fluid flow within energy production system 10 by gathering information from sensors 122, 128, 130, 162, 168 and 170 through network 30. In the depicted example, energy production program 200 regulates the fluid flow within energy production system 10 by sending signals through network 30 to bypass valves 124 and 164, and regulation valves 126 and 166, to determine when to stay closed, or when and how much to open.

Network 30 can be, for example, a local area network (LAN), a wide area network (WAN) such as the Internet, or a combination of the two, and can include wired, wireless, or fiber optic connections. In general, network 30 can be any combination of connections and protocols that will support communications between computer 100 and sensors and valves.

Figure 2:
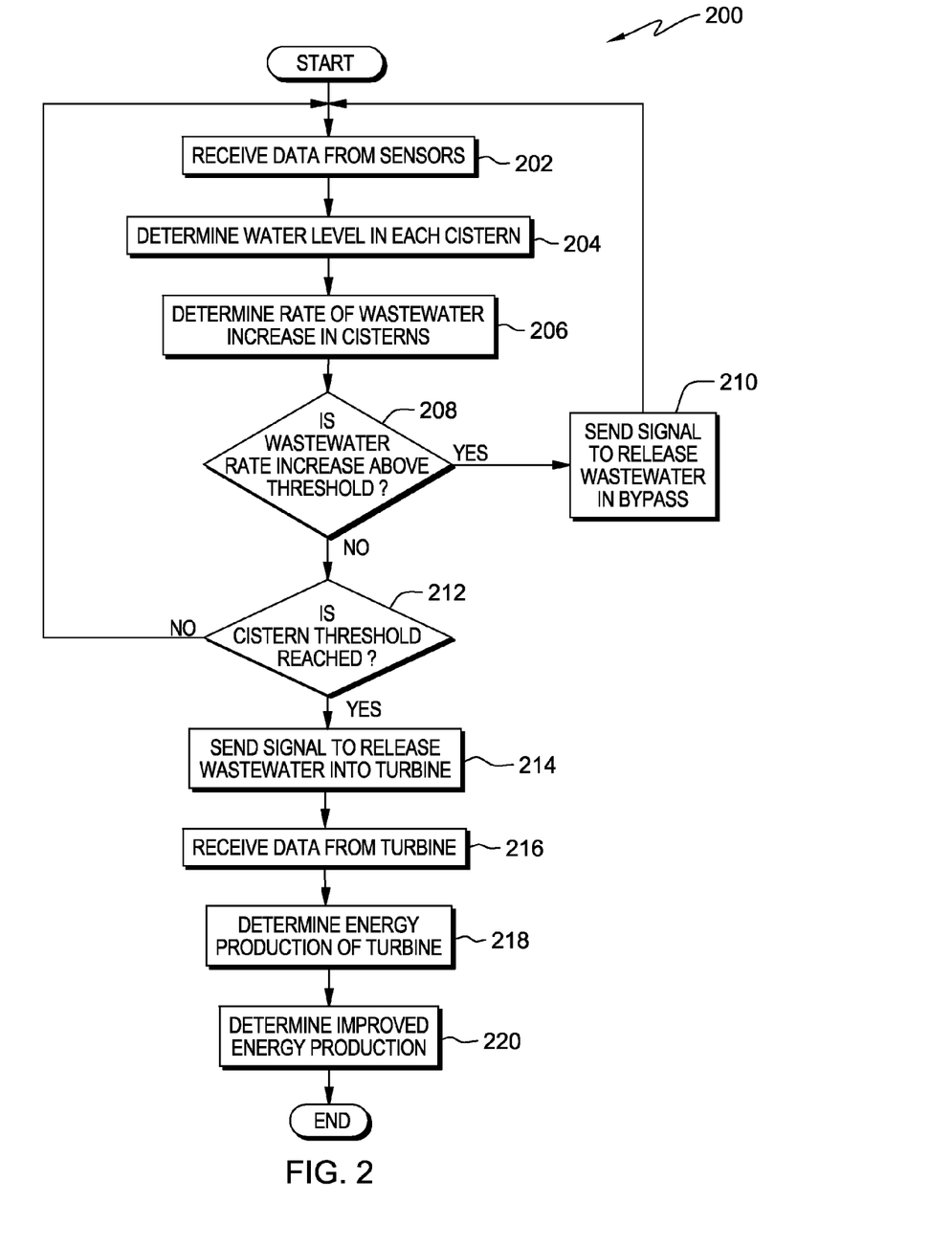
FIG. 2 is a flowchart depicting operational steps of an energy production program, on a computer within energy production system of FIG. 1, in accordance with an embodiment of the present invention.

FIG. 2 is a flowchart depicting operational steps of energy production program 200 for receiving information gathered from sensors and determining when to send signals through network 30 to valves within energy production system 10 to regulate the valves to open or close, in accordance with an embodiment of the present invention.

Before an exemplary embodiment of energy production program 200 initiates, fluid from the fluid sources collects within the fluid reservoirs of energy production system 10. In an exemplary embodiment, fluid reservoir 120 collects fluid from fluid sources 110 and 112, while fluid reservoir 160 collects fluid from fluid sources 114 and 116, along with collecting fluid from fluid reservoir 120.

In an exemplary embodiment, in step 202, energy production program 200 receives data from the sensors of energy productions system 10. In an example, energy production program 200 receives data from sensors 122, 128, 130, 162, 168 and 170 through network 30. In step 204, energy production program 200 determines a water level in each fluid reservoir utilizing the data received from sensors. In an example, energy production program 200 determines the water level in fluid reservoir 120 by utilizing the data received from sensor 122, and determines the water level in fluid reservoir 160 by utilizing the data received from sensor 162. In this example, sensors 122 and 162 have the capability to determine the water level within respective fluid reservoirs 120 and 162. In another example, energy production program 200 utilizes data received from sensors 128, 130, 168 and 170 related to the flow rate of fluid to facilitate the determination of the fluid level within fluid reservoir 120 and fluid reservoir 160.

In step 206, energy production program 200 determines the rate of the fluid level increase within each fluid reservoir utilizing the data received from the sensors. In an example, energy production program 200 determines the rate of the fluid level increase within fluid reservoir 120 by utilizing the data received from sensor 122, and determines the rate of the fluid level increase within fluid reservoir 160 by utilizing the data received from sensor 162. In this example, sensors 122 and 162 have the capability to determine the rate of fluid level increase water level within respective fluid reservoirs 120 and 160. In another example, energy production program 200 utilizes data received from sensors 128, 130, 168 and 170 related to the flow rate of fluid to facilitate the determination of the fluid level within fluid reservoir 120 and fluid reservoir 160.

In step 208, energy production program 200 determines if the rate of the fluid level increase in the fluid reservoirs is above a predetermined threshold. If the rate of the fluid level increase in the fluid reservoir is above a predetermined threshold (yes branch of decision), energy production program 200 sends a signal to a bypass valve to open to release fluid through a bypass fluid connection from the fluid reservoir (step 210), and then loops back to receiving signals relating to the fluid level in the fluid reservoirs. In an example, if energy production program 200 determines that fluid is increasing at a rate of 30 liters per minute in fluid reservoir 120 and the predetermined threshold is only 20 liters per minute, then energy production program 200 sends a signal to bypass valve 124 through network 30 to open enough to release 10 liters per minute through fluid connection 132 to fluid reservoir 160. If the rate of the fluid level increase in the fluid reservoir is below a predetermined threshold (no branch of decision), energy production program 200 determines if a fluid reservoir fluid level threshold is reached (step 212). If energy production program 200 determines that the fluid level of the fluid reservoir is above a predetermined threshold level (yes branch of decision), then energy production program 200 sends a signal to a regulation valve to open for fluid connection to a turbine (step 214). In an example, if energy production program 200 determines that the fluid level in fluid reservoir 120 is above the predetermined threshold level of 100 liters, then energy production program 200 sends a signal to regulation valve 126 through network 30 to open enough to release 20 liters per minute through fluid connection 134 to turbine 140. If energy production program 200 does not determine that the fluid level of the fluid reservoir is above the predetermined threshold (no branch of decision) then energy production program 200 loops back to receiving signals relating to fluid level in fluid reservoir.

In step 216, energy production program 200 receives data related to the amount of energy produced from the turbines from sensors associated with the turbines. In an example, energy production program 200 receives data related to the amount of energy produced from turbine 140 through network 30. In step 218, energy production program 200 determines the amount of energy produced by the turbine. In an example, energy production program 200 determines the amount of energy produced by turbine 140 by utilizing data received from turbine 140 through network 30.

In step 220, energy production program 200 determines how to improve energy production within energy production system 10 utilizing data gathered by energy production program 200 over time. In exemplary embodiments, once energy production program 200 determines how to improve energy production within energy production system 10, energy production program 200 may loop back to beginning of the program depicted in FIG. 2 to implement a schedule. However, in this exemplary embodiment, the schedule that is determined for how energy production system operates is only a preliminary schedule that can change due to factors that differ within the operation of energy production system. In an example, the amount of fluid received from fluid sources 110, 112, 114, and 116 are not substantially consistent every morning, or the fluid received may not be received at an exact time and for an exact length of time. When variations occur within energy production system 10, energy production program 200 utilizes the data gathered from the sensors to determine if bypass valves must be opened and/or if the rate of flow of the fluid through the turbines must be increased.

In exemplary embodiments, energy production program 200 determines what days of the week and/or what times of day produce the most amounts of fluid from each fluid source. From this historical data collected, energy production program 200 determines a schedule to send signals to regulation valves and bypass valves to produce the most amount of possible energy from turbines within energy production system 10. Typically, but not necessarily, energy production program 200 determines a schedule to send signals to regulation valves and bypass valves that allows fluid to flow through fluid connections that lead to turbines in a continuous manner. Normally, turbines operate at a higher efficiency with a substantially consistent water flow. As such, if the water flow to the turbines is able to be at a substantially consistent water flow rate, then the turbines may be optimized to produce power.

In an example, energy production program 200 determines from historical data that fluid sources 110, 112, 114 and 116 produce 100 liters of fluid each from 8 AM until 9 AM Monday though Friday. Fluid reservoir 120 has a capacity of 100 liters and fluid reservoir 160 has a capacity of 200 liters. In this scenario, energy production program 200 determines that regulation valve 126 opens at a flow rate of 100 liters an hour right when fluid reservoir 120 starts to collect fluid to make sure that bypass valve 124 never has to open to let the fluid through fluid connection 132 from fluid reservoir 120 to fluid reservoir 160. In this example, all of the 200 liters of fluid collected in fluid reservoir 120 will flow through turbine 140 from 8 AM until 10 AM. Furthermore, in this example, energy production program 200 determines that regulation valve 166 opens at a rate of 100 liters an hour right when fluid reservoir 160 starts to collect fluid to make sure that bypass valve 164 never has to open to let the fluid through fluid connection 172 to the sewer. In this example, all of the 400 liters of fluid collected in fluid reservoir 160 flow through turbine 180 from 8 AM until 12 PM.

In other exemplary embodiments, one or more turbines may be included along fluid connection 132 and/or fluid connection 172 to produce energy. In exemplary embodiments, the one or more turbines included along fluid connection 132 and/or fluid connection 172 are sized to produced energy from the normal type of fluid flow that may typically occur therethrough. In an example, the fluid flow through fluid connection 132 is short, fast bursts of flow. Therefore, in this example, a turbine that is designed for high efficiency with high volume fluid flow is utilized.

Figure 3:
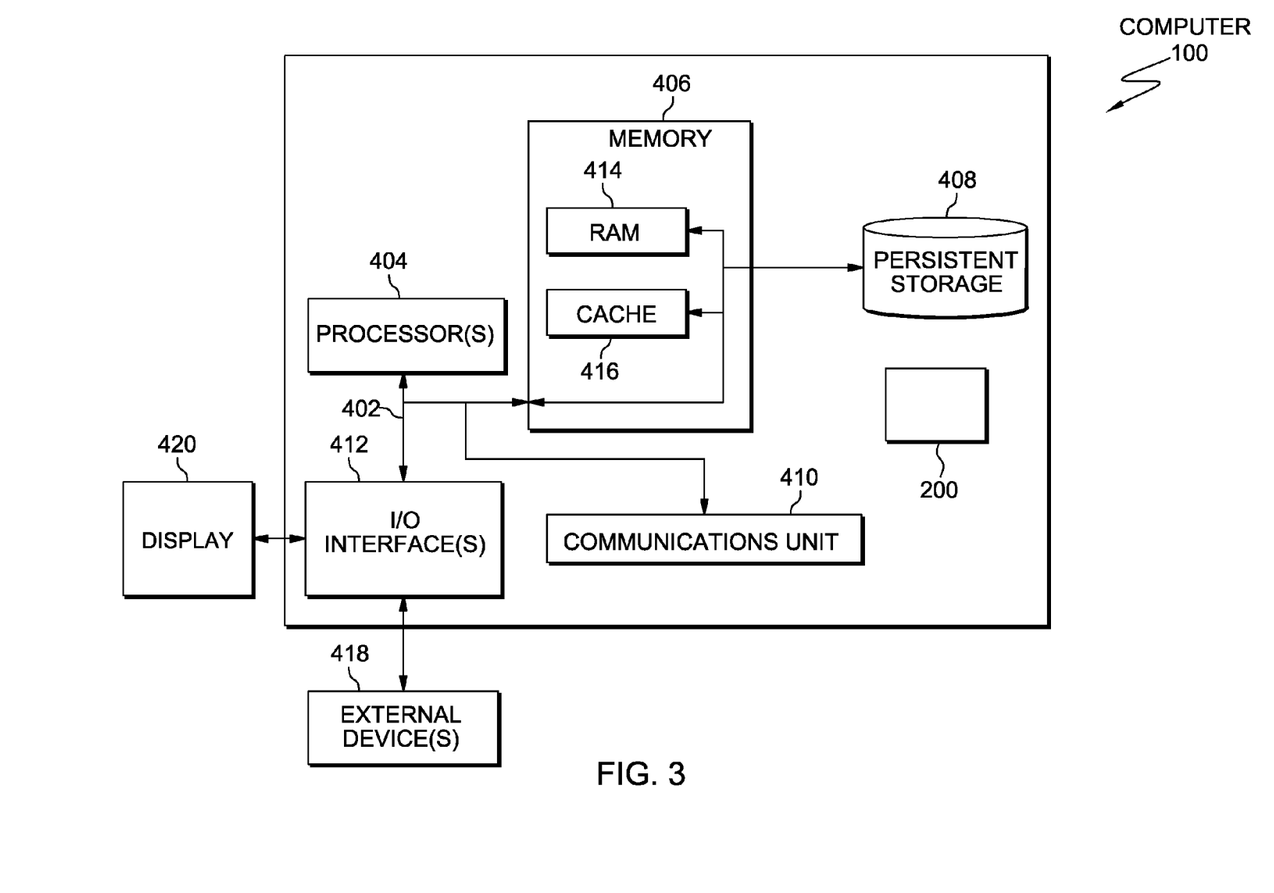
FIG. 3 depicts a block diagram of components of the computer executing the energy production program, in accordance with an embodiment of the present invention.

FIG. 3 depicts a block diagram of components of computer 10 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 100 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Energy production program 200 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other systems or devices, including resources of 122, 128, 130, 162, 168 and 170, and bypass valves 124 and 164, and regulation valves 126 and 166. In these examples, communications unit 410 includes one or more network interface cards. Communications unit 410 may provide communications through the use of either or both physical and wireless communications links. Energy production program 200 may be downloaded to persistent storage 408 through communications unit 410.

I/O interface(s) 412 allows for input and output of data with other devices that may be connected to computer 100. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., energy production program 200, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for energy production from fluid, the method comprising:
receiving historical data relating to a first historical fluid flow pattern of fluid flow into a first reservoir of a set of one or more fluid reservoirs;
determining a fluid level in the one or more fluid reservoirs utilizing data received from one or more sensors;
determining a rate, with respect to time, of the fluid level increase within one of the one or more fluid reservoirs utilizing the data received from the sensors;
determining if the rate of the fluid level increase in the one of the one or more fluid reservoirs is larger than a predetermined threshold;
on condition that the rate is larger than the predetermined threshold, sending a signal to a bypass valve to open and release fluid through a bypass fluid connection from the one of the one or more fluid reservoirs;
determining a first fluid level threshold for the first fluid reservoir based on the first historical data;
determining if the first fluid level threshold is reached in the one of the first fluid reservoir; and
on condition that the first fluid threshold is reached, sending a signal to a regulation valve to open for fluid connection from the first fluid reservoir to one or more turbines.

2. The method of claim 1, further comprising:
receiving data from the one or more sensors related to an amount of fluid produced from one or more fluid sources.

3. The method of claim 1, further comprising:
receiving data related to an amount of energy produced from the one or more turbines from sensors that are associated with the one or more turbines.

4. The method of claim 3, further comprising:
determining the amount of energy produced from the one or more turbines.

5. The method of claim 1, further comprising:
determining how to improve energy production utilizing data related to an amount of energy produced from the one or more turbines from sensors that are associated with the one or more turbines.

6. The method of claim 5, wherein the determining how to improve energy production utilizing data gathered over time includes determining a schedule to signal the regulation valve and the bypass valve that allows fluid to flow through fluid connections that lead to the one or more turbines in a continuous manner.

7. A computer program product for energy production from fluid, the computer program product comprising:
one or more non-transitory computer-readable storage media and program instructions stored on the one or more computer-readable storage media, the program instructions comprising:
program instructions to:
receive historical data relating to a first historical fluid flow pattern of fluid flow into a first reservoir of a set of one or more fluid reservoirs;
determine a fluid level in the one or more fluid reservoirs utilizing data received from one or more sensors;
determine a rate, with respect to time, of the fluid level increase within one of the one or more fluid reservoirs utilizing the data received from the sensors;
determine if the rate of the fluid level increase in the one of the one or more fluid reservoirs is larger than a predetermined threshold;
on condition the rate is larger than the predetermined threshold, send a signal to a bypass valve to open and release fluid through a bypass fluid connection from the one of the one or more fluid reservoirs;

determine a first fluid level threshold for the first fluid reservoir based on the first historical data;
determine if the first fluid level threshold is reached in the first fluid reservoir; and
on condition that the first fluid threshold is reached, send a signal to a regulation valve to open for fluid connection from the first fluid reservoir to one or more turbines.

8. The computer program product of claim 7, further comprising program instructions to:
receive data from the one or more sensors related to an amount of fluid produced from one or more fluid sources.

9. The computer program product of claim 7, further comprising, program instructions to:
receive data related to an amount of energy produced from the one or more turbines from sensors that are associated with the one or more turbines.

10. The computer program product of claim 9, further comprising program instructions to:
determine the amount of energy produced from the one or more turbines.

11. The computer program product of claim 7, further comprising program instructions to:
determine how to improve energy production utilizing data related to an amount of energy produced from the one or more turbines from sensors that are associated with the one or more turbines.

12. The computer program product of claim 11, wherein the program instructions to determine how to improve energy production utilizing data gathered over time includes program instructions to determine a schedule to signal the regulation valve and the bypass valve that allows fluid to flow through fluid connections that lead to the one or more turbines in a continuous manner.

13. A computer system for energy production from fluid, the computer system comprising:
one or more computer processors;
one or more computer-readable storage media;
program instructions stored on the computer-readable storage media for execution by at least one of the one or more processors, the program instructions comprising:
program instructions to:
receive historical data relating to a first historical fluid flow pattern of fluid flow into a first reservoir of a set of one or more fluid reservoirs;
determine a fluid level in the one or more fluid reservoirs utilizing data received from one or more sensors;
determine a rate, with respect to time, of the fluid level increase within one of the one or more fluid reservoirs utilizing the data received from the sensors;
determine if the rate of the fluid level increase in the one of the one or more fluid reservoirs is larger than a predetermined threshold;
on condition that the rate is larger than the predetermined threshold, send a signal to a bypass valve to open and release fluid through a bypass fluid connection from the one of the one or more fluid reservoirs;
determine a first fluid level threshold for the first fluid reservoir based on the first historical data;
determine if the first fluid level threshold is reached in the first fluid reservoir; and
on condition that the first fluid threshold is reached, send a signal to a regulation valve to open for fluid connection from the first fluid reservoir to one or more turbines.

14. The computer system of claim 13, further comprising program instructions to:
receive data from the one or more sensors related to an amount of fluid produced from one or more fluid sources.

15. The computer system of claim 13, further comprising program instructions to:
receive data related to an amount of energy produced from the one or more turbines from sensors that are associated with the one or more turbines.

16. The computer system of claim 15, further comprising program instructions to:
determine the amount of energy produced from the one or more turbines.

17. The computer system of claim 13, further comprising program instructions to:
determine how to improve energy production utilizing data related to an amount of energy produced from the one or more turbines from sensors that are associated with the one or more turbines.

18. The computer system of claim 17, wherein the program instructions to determine how to improve energy production utilizing data gathered over time includes program instructions to determine a schedule to signal the regulation valve and the bypass valve that allows fluid to flow through fluid connections that lead to the one or more turbines in a continuous manner.

* * * * *